Patented Oct. 9, 1934

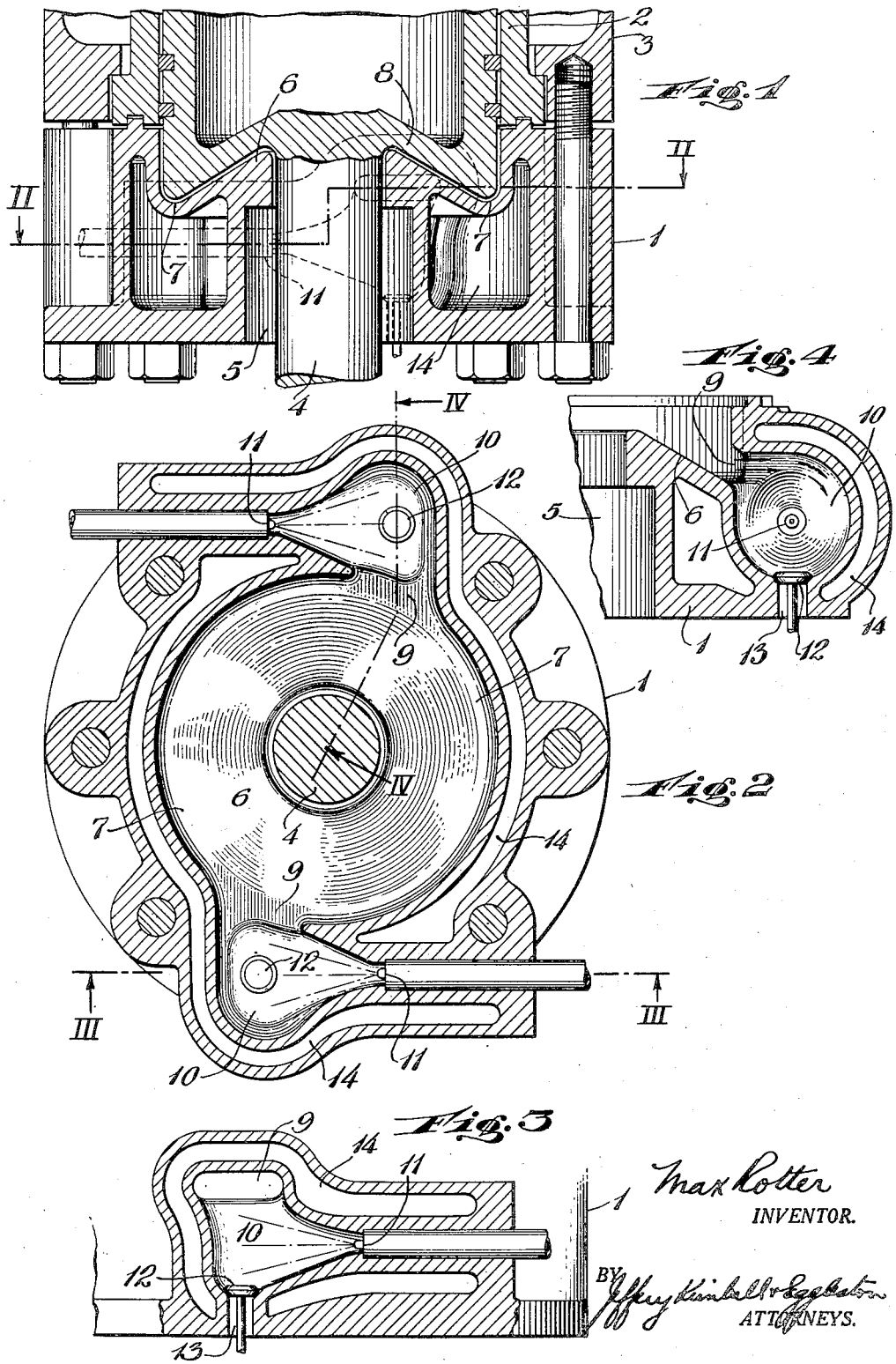

1,976,192

UNITED STATES PATENT OFFICE 1,976,192

DIESEL ENGINE CONSTRUCTION

Max Rotter, Milwaukee, Wis., assignor to Busch-Sulzer-Bros.-Diesel Engine Company, St. Louis, Mo., a corporation of Missouri Application June 30, 1932, Serial No. 620,077

12 Claims. (Cl. 123—32)

The invention comprises a cylinder head construction, for the lower or piston rod end of the cylinder of a double-acting injection type engine, embodying one or more combustion chambers, outside of the cylinder proper, into which chambers the fuel is injected and which with the head are designed to guard the piston rod against overheating by the combustion gases, the chambers also by their special arrangement contributing to the formation of an intimate mixture of the fuel and air to the end of improving combustion, all as more particularly described below.

In the drawing, which illustrates a preferred form of the invention,

Fig. 1 is a vertical section through the piston rod end of the cylinder and head of a double-acting injection type engine with the invention applied, Fig. 2 is a section on the line II—II of Fig. 1, Fig. 3 a vertical section through one of the combustion chambers, on the line III—III of Fig. 2, and Fig. 4 a transverse vertical section also through one of the combustion chambers and associated parts, on the line IV—IV of Fig. 2.

In Fig. 1, the reference 1 is applied to the lower head of the cylinder of a double-acting injection type engine, the cylinder comprising the liner 2 and jacket 3, provided with the usual over-run exhaust and scavenging ports (not shown) and the piston rod 4 reciprocating in the head in a stuffing box 5, as usual.

The end wall of the cylinder, as constituted by the head 1, has an upstanding boss or coned portion 6 producing a peripheral depression 7, the end wall of piston 8 preferably being re-entrant to conform thereto. Spaced around the cylinder wall, in the head, are a number of ports 9, preferably two or more, oppositely disposed, which serve as outlets for burning gases from the chambers 10 below described. While of large capacity the ports are of considerably greater dimension circumferentially than axially of the cylinder and arranged to release the gases more or less tangentially into the depression 7 adjacent the base of the conical surface 6 (Fig. 4) rather than directly opposite or against the piston rod, which it is desired to keep as cool as possible. Thus formed the ports are also fully uncovered promptly by the piston on its up stroke.

Each of the combustion chambers 10, into which the combustion air is compressed to fuel igniting temperature by the descending piston, as will be understood, communicates with the piston space through one of the ports 9. Liquid fuel is injected into the chambers by the injector or spray nozzles 11, which may be either of the solid or air injection type and preferably the former. These chambers may be and preferably are of a capacity, in the aggregate, to contain substantially the full charge of air required for the engine, the piston clearance being small, and the combustion chambers are of more or less conical or spray shape so as to conform closely to the shape of the spray discharge from the injector 11, the fuel thus being distributed immediately and uniformly in the air contained in the chambers. With the injectors arranged to inject the fuel axially of the chambers, below and transversely of the flow path through the ports (Fig. 3) and not directly into the cylinder or toward the piston rod, the latter is further protected from immediate contact with the fuel blast. As illustrated in Figs. 3 and 4, each of the ports 9 is located at or adjacent the highest point of its combustion chamber and is so arranged that on the down or compression stroke of the piston, the air entering the chambers is forced into them tangentially, setting up a turbulence which upon injection of the fuel promotes mixing therewith. The elongated shape of the ports contributes to this action.

The bottom valve 12 controls an outlet 13 for the removal from time to time of any oil sludge that may be scraped off the piston or develop in the chambers, without dismantling the cylinder head or the combustion chambers, it being a feature of the construction that these outlets are situated at the lowest level of the combustion space and open directly to the outside of the head.

In the form illustrated the combustion chambers are shown associated with the cylinder head, which arrangement not only permits the location of the ports in the head itself, thereby avoiding any complication of the cylinder jacket and liner construction but also, when the chambers constitute an integral part of the head, as is preferred, enables both head and chambers to be served by a common water jacket 14.

I claim:

1. In an injection type engine the combination with a cylinder liner and jacket, of a head structure closing the cylinder and having a peripheral depression on the inner face thereof, a combustion chamber with fuel injection means therein and an outlet from said chamber to the cylinder located to discharge into said depression.

2. In an injection type engine, the combination with a cylinder liner and jacket, of a head structure closing the cylinder and having a peripheral depression on the inner face thereof, a combustion chamber within and integral with said structure, fuel injection means therein, and a port located in said depression communicating with the combustion chamber.

3. In a double-acting injection type engine, the combination of a head structure for the lower end of the cylinder having a peripheral depression on the inner face thereof, a combustion chamber within said structure, a port connecting the chamber with said depression, a piston shaped to enter the depression at the end of its stroke thereby to compress the air through said port into the chamber, and fuel injection means in said chamber arranged to discharge transversely of the path of said air.

4. In a double-acting injection type engine, the combination of a head structure for the lower end of the cylinder having a peripheral depression on the inner face thereof, a combustion chamber within said structure, extending into the head below the bottom of said depression, a port connecting the latter with the upper part of the chamber, a piston shaped to enter the depression at the end of its stroke to compress the air through said port into the chamber, and fuel injection means in said chamber arranged to discharge transversely of and below the path of said air.

5. In an injection type engine the combination with the cylinder, of a head structure closing the same and having a peripheral depression in its inner face, within the cylinder, a combustion chamber with fuel injection means therein formed in the head, a relatively restricted port connecting the chamber with said depression and said fuel injection means being arranged to discharge toward an opposite wall of the chamber and substantially at right angles to the axis of said port.

6. In an injection type engine the combination with the cylinder, of a head structure closing the same and having a peripheral depression in its inner face, within the cylinder, a plurality of cone shaped combustion chambers each with fuel injection means therein formed in the head, a port connecting each chamber with said depression, said fuel injection means being arranged to discharge axially of the chambers and substantially at right angles to the axes of the respective ports.

7. In an injection type engine the combination with the cylinder, of a head structure closing the same and having a peripheral depression in its inner face, within the cylinder, a plurality of combustion chambers spaced around and formed in the head with fuel injection means in each chamber and a plurality of relatively restricted ports each providing lateral communication between one of said chambers and the depression, said fuel injection means arranged to discharge within the chamber transversely of the respective ports.

8. In a double-acting injection type engine, the combination with the cylinder, piston and rod, of a head for the lower end of the cylinder having a central, upstanding boss in which the rod reciprocates, a combustion chamber having a relatively restricted port connecting the same with the cylinder substantially on a level with the base of said boss and an injector adapted to discharge fuel into said chamber.

9. In a double-acting injection type engine, the combination with the cylinder, piston and rod, of a head for the lower end of the cylinder having a central, upstanding boss in which the rod reciprocates, a combustion chamber, and an injector adapted to discharge fuel into the same, said chamber being connected with the cylinder by a relatively restricted port of materially greater dimension circumferentally than axially of the cylinder and located substantially on a level with the base of said boss.

10. In a double-acting injection type engine, the combination with the cylinder, of a combustion chamber extending below the lower end thereof, a relatively restricted port connecting the bottom of the cylinder with the top of said chamber and a sludge outlet in the bottom of the latter.

11. In a double-acting injection type engine, the combination with the cylinder, of a combustion chamber adjacent the piston rod gland at the lower end thereof, a fuel injector in said chamber, a port connecting the cylinder and chamber, said injector adapted to discharge within the chamber across and beneath the flow path through said port.

12. In a double-acting injection type engine, a combustion chamber adjacent to the piston rod gland and having a port communicating with the adjacent or lower end of the cylinder, and a fuel injector adapted to discharge into said chamber, the latter being of substantially conical shape in the line of and conforming to the discharge from said injector and said port being relatively restricted and arranged to conduct the compression air into the chamber transversely of the axis thereof.

MAX ROTTER.